United States Patent Office 3,497,675
Patented Feb. 24, 1970

3,497,675
ELECTRIC CIRCUIT FOR A HAIR DRYER
Chikao Yoshiike, 191, 6-chome, Gotanda, Shinagawa-ku; Hideyuki Tsuru, 7 Shimbori-cho, Azabu, Minato-ku; and Yoichi Yoshiike, 191, 6-chome, Gotanda, Shinagawa-ku, all of Tokyo, Japan
Filed Apr. 4, 1966, Ser. No. 539,682
Claims priority, application Japan, Apr. 5, 1965, 40/26,370; July 19, 1965, 40/58,826
Int. Cl. H05b 3/02
U.S. Cl. 219—482    1 Claim

ABSTRACT OF THE DISCLOSURE

An electric circuit for a hair dryer of the type including a wire heating element and a motor driven fan in which AC current is fed to the circuit via a controlling switch, the wire heating element being connected across the AC source, the motor including at least two terminals, two electrically parallel leads being tapped into the wire at spaced points, similarly poled rectifying means are interposed on the respective leads, means electrically connect one end of each rectifying means to one terminal of the motor and further means electrically connect the other terminal of the motor to the wire heating element at the midpoint between the tapped connections of the parallel leads with the wire heating element.

---

The present invention relates broadly to the art of hair dryers. More particularly this invention relates to an electric circuit for a hair dryer of the type including a wire heating element and a motor driven fan.

The object of this invention is to provide an electric circuit for such a hair dryer which establishes greater efficiency and results in a hair dryer that is more economical to produce and operate.

Figure 1:
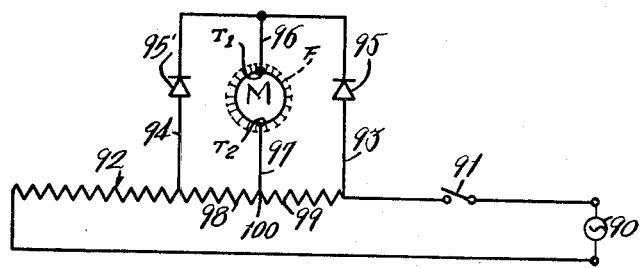
Figure 2:
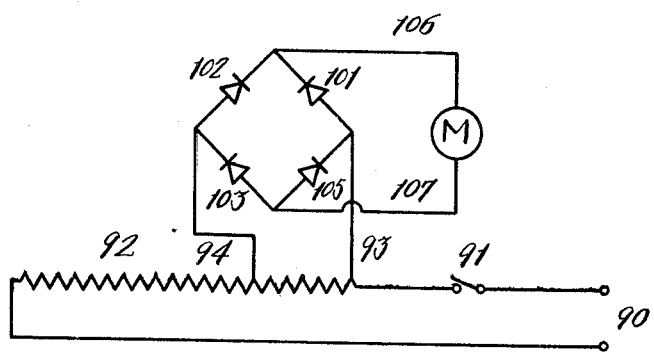

Further and more specific advantages and objects will be apparent from the following description taken in connection with the accompanying drawings in which:

FIGURE 1 is a schematic circuit diagram illustrating the improvement of this invention, and FIGURE 2 is a schematic circuit diagram illustrating a prior art arrangement.

FIGURE 1 illustrates an electric circuit which is suitably employed in conjunction with a hair dryer including a heating element and a motor driven fan diagrammatically indicated at F. The hair dryer derives its driving power from the source 90 of AC current at F for a household lighting line. The source 90 is connected through a switch 91 to the wire heating element 92. Two parallel leads 93 and 94 are tapped or branch off from the heating wire at two separate or spaced points of the heating wire 92 and these leads 93 and 94 are electrically connected through respective silicone or any other suitable similarly poled rectifiers 95, 95' to a neutral line or lead 96 which is in turn electrically connected through terminals T, and T₂ of the motor M to another neutral line or lead 97 which is electrically connected to the heating wire 92 at the midde point between the connections of branch leads 93 and 94 thereto.

With the above arrangement, when AC current is supplied from the source 90, current flows through the heating wire 92 at all times, but the motor M is alternately supplied with current from the circuit including the branch lead 93 rectifier 95 and neutral lines 96 and 97 on one hand, and from the circuit including the branch lead 94, rectifier 95' and neutral lines or leads 96 and 97 on the other hand. Therefore, full-wave rectified current flows though the motor M so as to cause the motor M to rotate without loss of electricity. Since the leads 93 and 94 are alternately cut off the supply of electricity, the wire heating element sections 98 and 99 on the opposite sides of the contact point 100 of the neutral line 97 with the heating wire 92 are connected in series with each other when one of the branch leads 93 and 94 is not supplied with current whilst the wire sections 98 and 99 are connected in parallel to each other when the other branch lead is not supplied with current. The series connection and parallel connection are alternately changed by AC, and accordingly, the parallel connection distance between the wire heating element 92 and the motor circuit is reduced to one half of the distance between the branch leads 93 and 94 and the wire heating element sections 98 and 99 between the branch leads 93 and 94 are heated by repeating the parallel and series connections alternately.

The novel circuit referred to above is advantageous over the conventional prior art circuit illustrated in FIGURE 2 because of its simpler construction and lower production cost. In the conventional circuit of FIGURE 2 four rectifiers 101, 102, 103 and 104 are connected so as to form a bridge circuit and the motor M is connected through leads 106 and 107 to the bridge circuit so as to be supplied with DC through the rectifiers from the source 90. In this circuit since the heating wire section between the branch leads 93 and 94 is at all times connected to the motor circuit in parallel thereto, the heat efficiency in the heating wire section is low. In addition, since four rectifiers are employed production cost of a hair dryer employing such four rectifiers increases and the volume of the dryer body will be inevitably larger.

While a preferred embodiment of the invention has been shown and described in detail it will be understood that the same is for the purpose of illustration only and is not be taken as a definition of the scope of the invention, reference being had for this purpose to the appended claim.

What is claimed is:

1. An electric circuit for a hair dryer of the type including a heating element and a motor driven fan comprising a source of AC current, a wire heating element connected across said source, a switch means interposed between said source and said wire for controlling current flow therein, an electric motor having at least two terminals, two electrically parallel leads tapped into said wire at two spaced points thereof, two rectifying means each operatively, electrically connected at one end with one of said leads, said rectifying means being similarly poled, means electrically connecting the other ends of both rectifying means with one of said terminals of said electric motor, and means electrically connecting the other terminal of said motor with said wire at the midpoint between the tapped connections of said parallel leads with said wire heating element.

References Cited

UNITED STATES PATENTS 3,348,020  11/1967  Cooper _____ 219—370
3,377,715  4/1968   Hübner _____ 219—370

BERNARD A. GILHEANY, Primary Examiner
F. E. BELL, Assistant Examiner